United States Patent
Volchegursky et al.

(10) Patent No.: US 9,979,669 B1
(45) Date of Patent: May 22, 2018

(54) PROJECTING RESOURCE ALLOCATION TO ACHIEVE SPECIFIC APPLICATION OPERATION TIMES IN A VIRTUALLY PROVISIONED ENVIRONMENT

(71) Applicant: EMC Corporation, Hopkinton, MA (US)

(72) Inventors: Dmitry Volchegursky, Pleasanton, CA (US); Dmitry Limonov, Dublin, CA (US); Boris Shpilyuck, Dublin, CA (US); Dmitry Y. Korshunov, Pleasanton, CA (US); Shu-Shang Sam Wei, Danville, CA (US)

(73) Assignee: EMC Corporation, Hopkinton, NJ (US)

( * ) Notice: Subject to any disclaimer, the term of this patent is extended or adjusted under 35 U.S.C. 154(b) by 903 days.

(21) Appl. No.: 14/106,465

(22) Filed: Dec. 13, 2013

(51) Int. Cl.
H04L 12/911 (2013.01)
G06F 9/46 (2006.01)
G06F 9/50 (2006.01)

(52) U.S. Cl.
CPC .................................. H04L 47/70 (2013.01)

(58) Field of Classification Search
CPC ....................................................... H04L 47/70
See application file for complete search history.

(56) References Cited

U.S. PATENT DOCUMENTS

| | | | |
|---|---|---|---|
| 2007/0118414 A1* | 5/2007 | Asaki ..................... | G06F 9/505 709/238 |
| 2009/0281818 A1* | 11/2009 | Li .......................... | G06Q 10/04 705/301 |
| 2014/0089509 A1* | 3/2014 | Akolkar ................ | H04L 41/147 709/226 |
| 2014/0244844 A1* | 8/2014 | Minakuchi ............ | G06F 9/5083 709/226 |
| 2014/0258534 A1* | 9/2014 | Allrich .................. | H04L 47/822 709/226 |
| 2015/0067294 A1* | 3/2015 | Hu .......................... | G06F 3/061 711/170 |
| 2015/0236974 A1* | 8/2015 | Minamitake .......... | H04L 47/726 709/226 |

FOREIGN PATENT DOCUMENTS

CN        104424106        * 3/2015

* cited by examiner

*Primary Examiner* — Dustin Nguyen
*Assistant Examiner* — Juan C Turriate Gastulo
(74) *Attorney, Agent, or Firm* — Dergosits & Noah LLP; Todd A. Noah

(57) ABSTRACT

Projecting resource allocations to achieve specified application operation times in a virtually provisioned environment is described. A system identifies a time period associated with an average of application operation times. The system calculates a resource ratio based on a resource allocated to a number of application operations associated with the time period divided by the number of application operations associated with the time period. The system calculates a projected resource allocation based on a projected number of application operations multiplied by the resource ratio. The system outputs the projected resource allocation to assist in resource management.

15 Claims, 5 Drawing Sheets

PROJECTING RESOURCE ALLOCATION TO ACHIEVE SPECIFIC APPLICATION OPERATION TIMES IN A VIRTUALLY PROVISIONED ENVIRONMENT

BACKGROUND

An enterprise may face a challenge in evaluating whether sufficient resources are allocated to sufficiently support the users of a critical enterprise application or whether sufficient resources are allocated to meet requirements of service level agreements for a critical enterprise application. An application's operations may include simple low level, often atomic, system operations, such as document check-in, object create, and document relate, and higher level operations executed in the context of some business goal, such as paying for a purchase.

Two types of application operations that users can perform include operational screen opening and operation on a screen. The evaluation challenge is that any such high level application operation can trigger a set of simpler operations, all the way down to atomic operations, such as the operations to save or delete an object. For example, many "open screen" high-level operations load a screen and execute data services to populate the screen's result list and charts.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Embodiments herein provide projecting resource allocations to achieve specified application operation times in a virtually provisioned environment. A system identifies a time period associated with an average of application operation times. For example, an analysis application identifies last Monday from 12:00 PM to 1:00 PM as the last time when a healthcare application's medication ordering operation had an average execution time of 1.5 seconds, which is the new average execution time specified for the medication ordering operation by a new service level agreement. The system calculates a resource ratio based on a resource allocated to a number of application operations associated with the time period divided by the number of application operations associated with the time period. For example, the analysis application divides the 24,000 MB of memory allocated to the 1,500 medication ordering operation on Monday from 12:00 PM to 1:00 PM by the 1,500 medication ordering operations on Monday from 12:00 PM to 1:00 PM to calculate the resource ratio of 16 MB of memory for every mediation ordering application required to achieve the average execution time of 1.5 seconds for the medication ordering application.

The system calculates a projected resource allocation based on a projected number of application operations multiplied by the resource ratio. For example, the analysis application multiplies the current 4,000 medication ordering operations by the resource ratio of 16 MB of memory for every mediation ordering application required to achieve the average execution time of 1.5 seconds for the medication ordering operation to calculate a projected resource allocation of 64,000 MB of memory required to achieve the average execution time of 1.5 seconds for the 4,000 medication ordering operations. The system outputs the projected resource allocation. For example, the analysis application outputs the projected resource allocation of 64,000 MB of memory required to achieve the average execution time of 1.5 seconds for the 4,000 medication ordering operations via a user interface. The analysis application calculates the amount of allocated resources required for each application to achieve the requirements of their corresponding service level agreements, enabling the achievement of all service level agreement requirements without wastefully allocating too many resources for any application.

Figure 1:
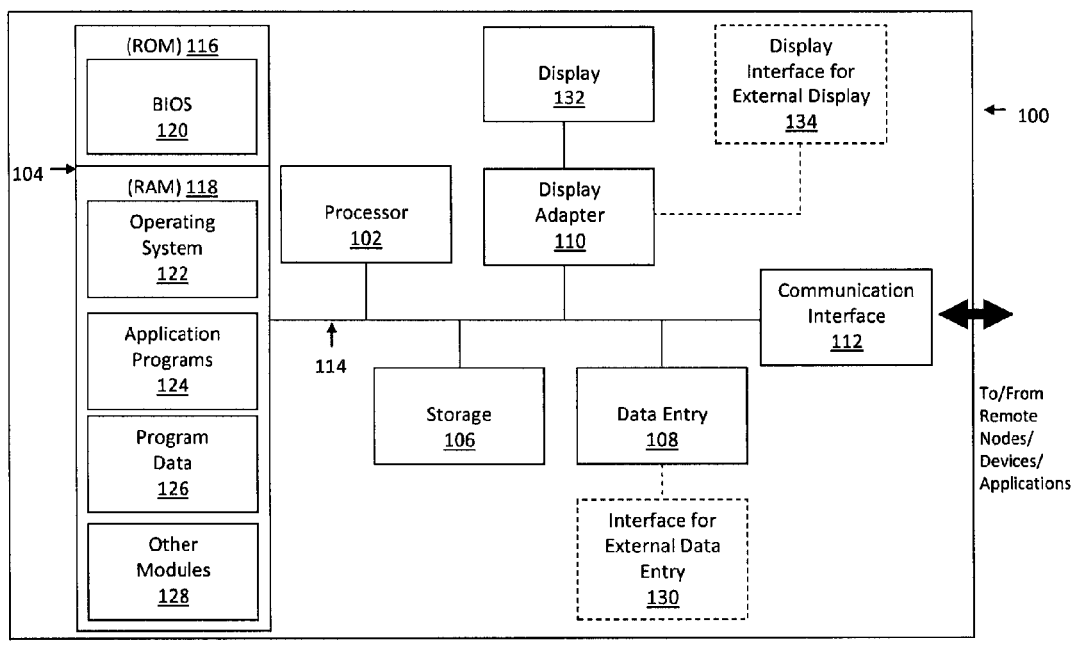
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

The methods described herein can be embodied in executable instructions stored in a computer readable medium for use by or in connection with an instruction execution machine, apparatus, or device, such as a computer-based or processor-containing machine, apparatus, or device. Those skilled in the art will appreciate that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. Those skilled in the art will appreciate that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for projecting resource allocations to achieve specified application operation times in a virtually provisioned environment.

Figure 2:
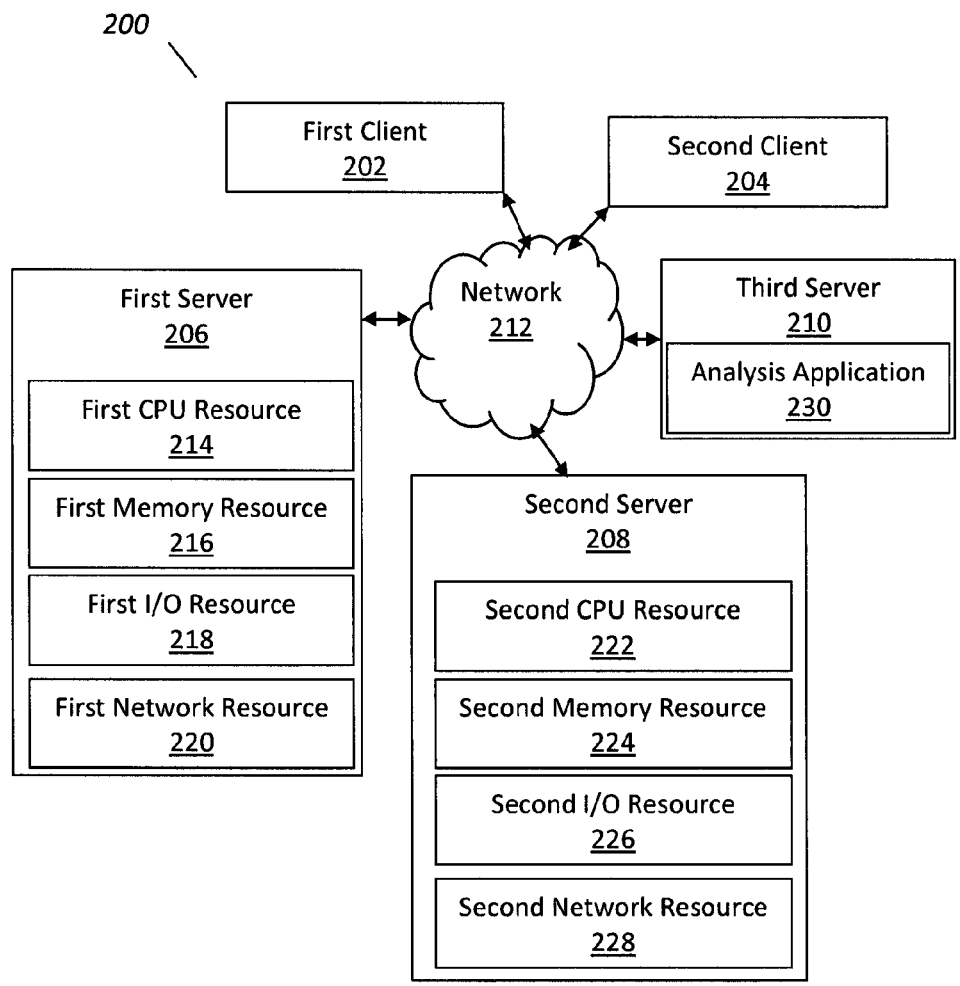
FIG. 2 illustrates a block diagram of an example system for projecting resource allocations to achieve specified application operation times in a virtually provisioned environment, under an embodiment.

FIG. 2 illustrates a block diagram of a system that implements projecting resource allocations to achieve specified application operation times in a virtually provisioned environment, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The clients 202-204 and the servers 206-210 communicate via a network 212. An enterprise uses the clients 202-204 to execute an enterprise application via the servers 206-208. The first server 206 allocates a first CPU resource 214, a first memory resource 216, a first I/O resource 218, and a first network resource 220 to process an enterprise application's operation in a virtually provisioned environment. The second server 208 allocates a second CPU resource 222, a second memory resource 224, a second I/O resource 226, and a second network resource 228 to process an enterprise application's operation in a virtually provisioned environment.

FIG. 2 does not depict the location of an enterprise application because the operations of the enterprise application may be processed by any combination of the resources 214-220 allocated by the first server 206 and the resources 222-228 allocated by the second server 208. The third server 210 includes an analysis application 230 to project resource allocations to achieve specified application operation times in a virtually provisioned environment. Although FIG. 2 depicts the system 200 with two clients 202-204, three servers 206-210, one network 212, two CPU resources 214 and 222, two memory resources 216 and 224, two I/O resources 218 and 226, two network resources 220 and 228, and one analysis application 230, the system 200 may include any number of clients 202-204, servers 206-210, networks 212, CPU resources 214 and 222, memory resources 216 and 224, I/O resources 218 and 226, network resources 220 and 228, and analysis applications 230. The clients 202-204 and the servers 206-210 may each be substantially similar to the system 100 depicted in FIG. 1.

Application operation statistics, such as the number of application operations executing, the average application operation times, and the amount of resources allocated to executing the application operations, may vary considerably over time in a virtually provisioned environment as system loads change and resources are allocated and reallocated in response to the changing system loads. Therefore, the analysis application 230 logs the start time, the finish time, and the type of each application operation over the course of an evaluation period, and calculates the application operation statistics corresponding to shorter time periods based on the logged information about the application operations. For example, the analysis application 230 logs information about medication ordering operations and doctor office visit scheduling operations over the course of a week, and calculates application operation statistics corresponding to each hour of the week. After the end of the evaluation period, the analysis application 230 can use the calculated statistics to project resource allocations to achieve specific application operation times in a virtually provisioned environment based on the times when the analysis application 230 logged the application operation statistics.

Graphs and a chart of calculated and logged application operation statistics are described below in reference to FIG. 3 and FIG. 4 below. A system administrator may specify the times for the evaluation period and the shorter time periods. Longer evaluation periods enable the logging of greater amounts of application operation information, which increases the likelihood that this historical data will include the average operation times specified by the user for an application operation.

The analysis application 230 may reduce the complexity of the calculations if the information about the involved servers is captured at endpoints' configuration for each application operation. Therefore, instead of the analysis application 230 taking a snapshot of the statistics for the resources of all servers in a virtually provisioned environment, it is possible for the analysis application 230 to probe only relevant servers for each specific application operation. The analysis application 230 may record the utilization measurement for each resource for servers identified as involved with an application operation by an endpoints configuration. For example, the analysis application 230 records the utilization measurement for each resource for the servers 206 and 208 because the endpoints configuration indicates that other servers (not depicted in FIG. 2) in the virtually provisioned environment are not involved in the processing the healthcare application operation to order medication.

The system 200 identifies a time period associated with an average of application operation times. For example, a system user submits a search of historical data to identify when a healthcare application's medication ordering operation had an average execution time of 1.5 seconds, and the analysis application 230 responds by identifying last Monday from 12:00 PM to 1:00 PM as the last time when a healthcare application's medication ordering operation had an average execution time of 1.5 seconds, which is the new average execution time specified for the medication ordering operation by a new service level agreement. Each application operation has an execution time, which varies between a minimal execution time and an actual execution time. The actual execution time consists of the minimal execution time and a resource wait time, which is the time waiting for a resource to become available. Therefore, when a system administrator allocates more resources for an application, the resource wait time is reduced, which reduces the execution time. Although this example describes the average of application operation times as based on a service level agreement, a system user may select an average of application operation times which is not based on a service level agreement for calculating a projected resource allocation.

The system 200 calculates a resource ratio based on a resource allocated to the number of application operations associated with a time period divided by the number of application operations associated with the time period. For example, the analysis application 230 divides the 24,000 MB of memory allocated to the 1,500 medication ordering operation on Monday from 12:00 PM to 1:00 PM by the 1,500 medication ordering operations on Monday from 12:00 PM to 1:00 PM to calculate the resource ratio of 16 MB of memory for every mediation ordering application required to achieve the average execution time of 1.5 seconds for the medication ordering application. The resource ratio is directly related to the average of application operation times because the more resources available for each application operation to perform, the less time the execution will take, and the fewer resources available for each application operation to perform, the longer the execution will take. Although this example describes the allocated resource as memory, the allocated resource may be a central processing unit resource, a memory resource, an input-output resource, and/or a network resource. Similar to the examples describing the calculation of a projected memory allocation, the analysis application 230 may also calculate a projected central processing unit allocation, a projected input-output allocation, and a projected network allocation to enable the average operation times for a projected number of application operations to achieve the average execution time specified by the system user for the application operations.

The system 200 calculates a projected resource allocation based on a projected number of application operations multiplied by the resource ratio. For example, the analysis application 230 multiplies the current 4,000 medication ordering operations by the resource ratio of 16 MB of memory for every mediation ordering application required to achieve the average execution time of 1.5 seconds for the medication ordering operation to calculate a projected resource allocation of 64,000 MB of memory required to achieve the average execution time of 1.5 seconds for the 4,000 medication ordering operations. Although this example describes the projected number of application operations as equaling the current number of application operations, a system user may select a projected number of application operations which differs from the current number of application operations for calculating a projected resource allocation.

The system 200 outputs the projected resource allocation to assist in resource management. For example, the analysis application 230 outputs the projected resource allocation of 64,000 MB of memory required to achieve the average execution time of 1.5 seconds for the 4,000 medication ordering operations via a user interface or an application program interface. A system user may respond to the output of the projected resource allocation by adjusting the current resource allocation by provisioning either more resources or fewer resources to achieve the projected resource allocation. For example, a system user may provision the exact amount of additional memory required for an underachieving application to achieve the requirements of its service level agreement in a virtually provisioned environment, while precisely reducing the specific amount of memory allocated for an overachieving application, such that the previously overachieving application can still achieve the requirements of its service level agreement in the virtually provisioned environment. The analysis application 230 calculates the amount of allocated resources required for each application to achieve the requirements of their corresponding service level agreements, enabling the achievement of all service level agreement requirements without wastefully allocating too many resources for any application.

In addition to calculating a projected resource allocation for the only application operation of an application, the analysis application 230 may calculate a projected resource allocation for any of multiple application operations of an application. Although the examples below describe the analysis application 230 calculating a projected resource allocation for one of two application operations of an application, the analysis application 230 may calculate a projected resource allocation for any application operation of any number of multiple application operations of an application.

The system 200 identifies a time period associated with an average of application operation times. For example, the analysis application 230 identifies last Monday from 12:00 PM to 1:00 PM as the last time when a healthcare application's medication ordering operation had an average execution time of 1.5 seconds, which is the new average execution time specified for the medication ordering operation by a new service level agreement. For this example, the healthcare application also executes a doctor office visit scheduling operation, which the analysis application 230 will need to take into account when calculating a projected resource allocation for the healthcare application's medication ordering operation.

The system 200 may calculate a first resource utilization based on the number of application operations associated with a time period multiplied by the resource utilization per each individual application operation. For example, the analysis application 230 multiplies the 1,500 medication ordering operations on Monday from 12:00 PM to 1:00 PM by the 12 MB of memory required for each individual medication ordering operation to calculate a minimal memory utilization of 18,000 MB of memory required for the 1,500 medication ordering operations on Monday from 12:00 PM to 1:00 PM. Since the analysis application 230 may not be able to directly determine how much of a resource was consumed by each of the application operations at the specified time period, the analysis application 230 calculates the minimal resource consumption for each type of the application operations based on the minimal execution time for each type of application operation. A detailed description of calculating the resource utilization per each individual application operation is discussed in commonly owned U.S. application Ser. No. 13/785,088, entitled, METHOD AND SYSTEM FOR CALCULATING COSTS OF APPLICATION OPERATIONS IN A VIRTUALLY PROVISIONED ENVIRONMENT, by Dmitry Volchegursky, et al., filed Mar. 5, 2013, which is incorporated in its entirety herein for all purposes.

In addition, the system 200 may calculate a second resource utilization based on the number of the other application operations associated with a time period multiplied by the resource utilization per each of the individual other application operations. For example, the analysis application 230 multiplies the 900 doctor office visit scheduling operations on Monday from 12:00 PM to 1:00 PM by the 10 MB of memory required for each individual doctor office visit scheduling operation to calculate a minimal memory utilization of 9,000 MB of memory required for the 900 doctor office visit scheduling operations on Monday from 12:00 PM to 1:00 PM.

Further, the system 200 may calculate a total resource utilization based on the sum of a first resource utilization and a second resource utilization. For example, the analysis application 230 adds the minimal memory utilization of 18,000 MB of memory required for the 1,500 medication ordering operations on Monday from 12:00 PM to 1:00 PM to the minimal memory utilization of 9,000 MB of memory required for the 900 doctor office visit scheduling operations on Monday from 12:00 PM to 1:00 PM to calculate a total minimal memory utilization of 27,000 MB of memory required for the healthcare application on Monday from 12:00 PM to 1:00 PM.

The system 200 may calculate a resource utilization ratio based on a first resource utilization divided by the total resource utilization. For example, the analysis application 230 divides the minimal memory utilization of 18,000 MB of memory required for the 1,500 medication ordering operations on Monday from 12:00 PM to 1:00 PM by the total minimal memory utilization of 27,000 MB of memory required for the healthcare application on Monday from 12:00 PM to 1:00 PM to calculate the memory utilization ratio of two-thirds of the memory for the 1,500 medication ordering operations on Monday from 12:00 PM to 1:00 PM. The analysis application 230 calculates the resource utilization ratio based on the premise that the ratio of the resources actually consumed by each type of application operation is the same as the ratio of the minimal resource utilizations for each type of application operation.

The system 200 may calculate the resource allocated to the number of application operations associated with a time period based on the resource utilization ratio multiplied by a combined resource allocated to the number of application operations associated with a time period and the number of other application operations associated with the time period. For example, the analysis application 230 multiplies the memory utilization ratio of two-thirds of the memory required for the 1,500 medication ordering operations on Monday from 12:00 PM to 1:00 PM by the 36,000 MB of memory allocated to the healthcare application on Monday from 12:00 PM to 1:00 PM to calculate 24,000 MB of memory allocated to the 1,500 medication ordering operations on Monday from 12:00 PM to 1:00 PM. Therefore, the analysis application 230 calculates that the remaining 12,000 MB of memory was allocated to the 900 doctor office visit scheduling operations on Monday from 12:00 PM to 1:00 PM.

The system 200 calculates a resource ratio based on a resource allocated to the number of application operations associated with a time period divided by the number of application operations associated with the time period. For example, the analysis application 230 divides the 24,000 MB of memory allocated to the 1,500 medication ordering operation on Monday from 12:00 PM to 1:00 PM by the 1,500 medication ordering operations on Monday from 12:00 PM to 1:00 PM to calculate the resource ratio of 16 MB of memory for every mediation ordering application required to achieve the average execution time of 1.5 seconds for the medication ordering application. The analysis application 230 calculates the same resource ratio for the 1,500 medication ordering operations on Monday from 12:00 PM to 1:00 PM that share the 36,000 MB of memory with the 900 doctor office visit scheduling operations as the analysis application 230 previously calculated for the 1,500 medication ordering operations on Monday from 12:00 PM to 1:00 PM that was the healthcare application's only application operation.

The system 200 calculates a projected resource allocation based on the projected number of application operations multiplied by a resource ratio. For example, the analysis application 230 multiplies the current 4,000 medication ordering operations by the resource ratio of 16 MB of memory for every mediation ordering application required to achieve the average execution time of 1.5 seconds for the medication ordering operation to calculate a projected resource allocation of 64,000 MB of memory required to achieve the average execution time of 1.5 seconds for the 4,000 medication ordering operations.

After calculating a projected resource allocation, the system 200 outputs the projected resource allocation to assist in resource management. For example, the analysis application 230 outputs the projected resource allocation of 64,000 MB of memory required to achieve the average execution time of 1.5 seconds for the 4,000 medication ordering operations via a user interface or an application program interface. When the analysis application 230 calculates the projected resource allocation of 64,000 MB of memory required to achieve the average execution time of 1.5 seconds for the 4,000 medication ordering operations via a user interface, the analysis application 230 takes into account the memory required for the a doctor office visit scheduling operations.

Figure 3:
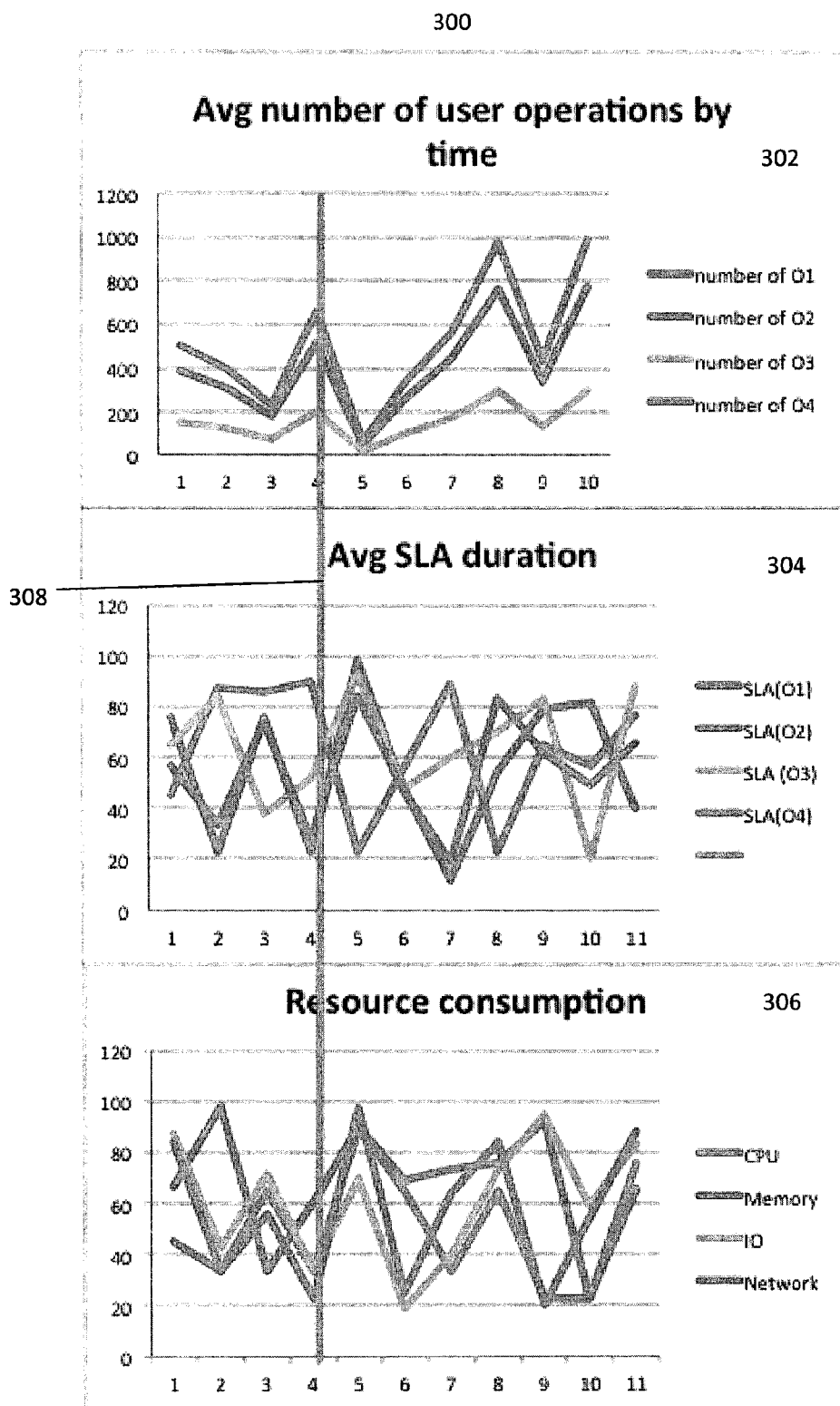
FIG. 3 illustrates example cross-reference graphs for projecting resource allocations to achieve specified application operation times in a virtually provisioned environment, under an embodiment.

FIG. 3 illustrates example cross-reference graphs for projecting resource allocations to achieve specified application operation times in a virtually provisioned environment, under an embodiment. The cross-reference graphs 300 include a graph 302 that depicts the average number of application (user) operations for four different application operations, O1, O2, O3, and O4, over the span of ten time units. The cross-reference graphs 300 also include a graph 304 that depicts the average application operation time (SLA) durations for four different application operations, O1, O2, O3, and O4, over the span of ten time units. The cross-reference graphs 300 further include a graph 306 that depicts the resource consumption of four resources, CPU, Memory, I/O, and Network, over the span of ten time units. The cross-reference graphs 300 additionally include a cross-reference line 308 that enables a system user to identify relationships between the information depicted in the graphs 302-306. For example, the system user selects time unit 4, for which the cross-reference line 308 identifies the average application operation time (SLA) duration of 20 seconds for application operation O2 in the graph 304, identifies 500 application operations for the application operation O2 in the graph 302, and identifies a 70% memory utilization in the graph 306. The cross-reference graphs 300 visually depict the type of cross-referenced information that the analysis application 230 may use to calculate a projected resource allocation.

Figure 4:
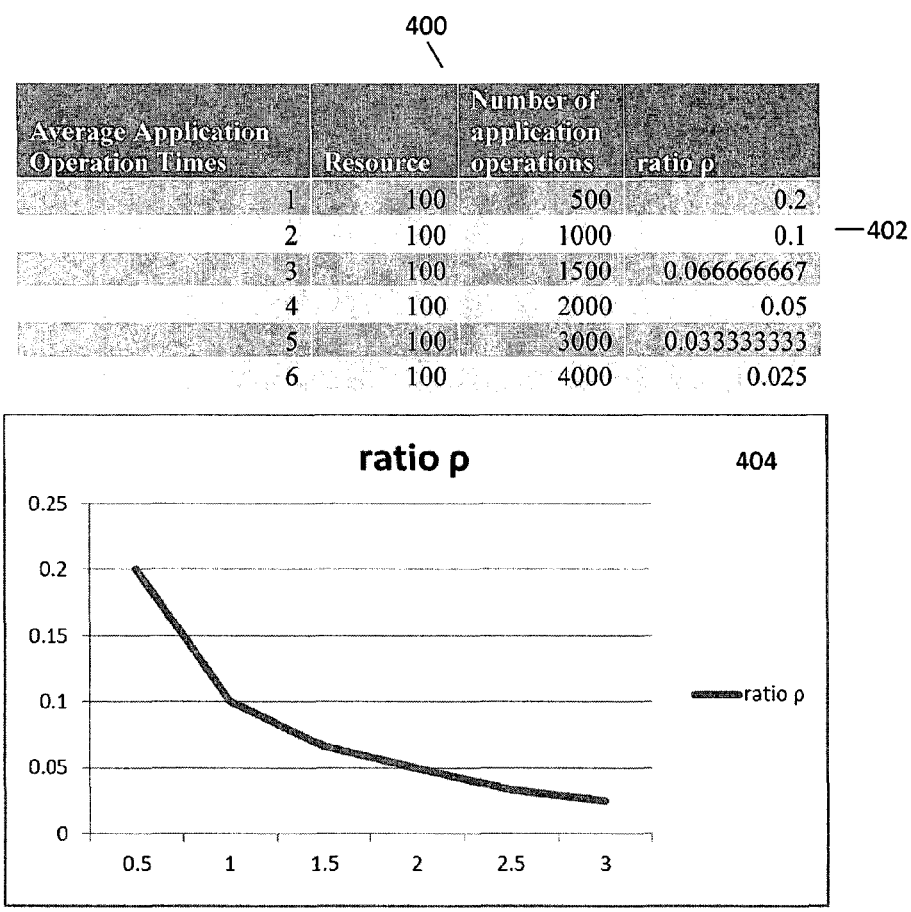
FIG. 4 illustrates an example ratio chart and graph for projecting resource allocations to achieve specified application operation times in a virtually provisioned environment, under an embodiment.

FIG. 4 illustrates an example ratio chart and graph for projecting resource allocations to achieve specified application operation times in a virtually provisioned environment, under an embodiment. The ratio chart and graph 400 includes a ratio chart 402 that depicts columns for average application operation times, resource allocation, number of application operations, and ratios. The ratio chart and graph 400 also includes a ratio graph 404 that depicts a vertical axis for the calculated ratio and a horizontal axis for the number of application operations in the thousands.

A system user may review the ratio chart and graph 400 to gain insights into the ratio of resources to the number of application operations under varying conditions. For example, the first data row of the ratio chart 402 indicates that when the average of application operation times equaled 1 second, 100 resource units were allocated for 500 application operations, which resulted in a calculated resource ratio of 0.2, based on 100 divided by 500. In another example, the second data row of the ratio chart 402 indicates that when the average of application operation times equaled 2 seconds, the same 100 resource units were allocated for 1,000 application operations, which resulted in a calculated resource ratio of 0.1, based on 100 divided by 1,000. Similarly, the ratio graph 404 depicts the calculated resource ratio of 0.2 corresponding to 500 application operations and the calculated resource ratio of 0.1 corresponding to 1,000 application operations. The ratio chart and graph 400 visually depict the type of ratio information that the analysis application 230 may use to calculate a projected resource allocation.

Figure 5:
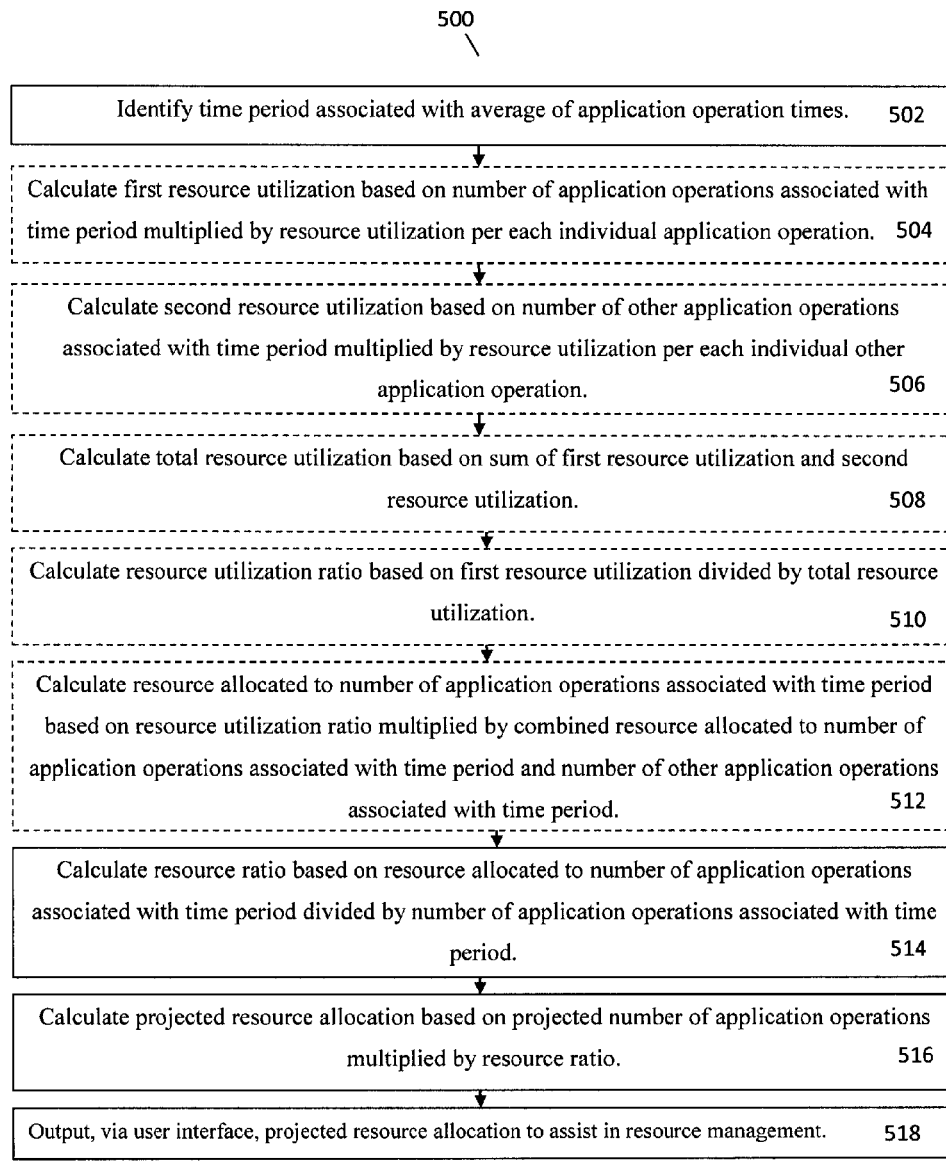
FIG. 5 is a flowchart that illustrates an example method of projecting resource allocations to achieve specified application operation times in a virtually provisioned environment, under an embodiment.

FIG. 5 is a flowchart that illustrates a method of projecting resource allocations to achieve specified application operation times in a virtually provisioned environment. Flowchart 500 illustrates method acts illustrated as flowchart blocks for certain steps involved in and/or between the client 202-204 and/or the servers 206-210 of FIG. 2. In some embodiments, the method illustrated by the flowchart 500 may be executed by a single server, such as server 206.

A time period associated with an average of application operation times is identified, block 502. For example, the analysis application 230 identifies last Monday from 12:00 PM to 1:00 PM as the last time when a healthcare application's medication ordering operation had an average execution time of 1.5 seconds, which is the new average execution time specified for the medication ordering operation by a new service level agreement.

A first resource utilization is optionally calculated based on the number of application operations associated with a time period multiplied by the resource utilization per each individual application operation, block 504. For example, the analysis application 230 multiplies the 1,500 medication ordering operations on Monday from 12:00 PM to 1:00 PM by the 12 MB of memory required for each individual medication ordering operation to calculate a minimal memory utilization of 18,000 MB of memory required for the 1,500 medication ordering operations on Monday from 12:00 PM to 1:00 PM.

A second resource utilization is optionally calculated based on the number of the other application operations associated with a time period multiplied by the resource utilization per each of the individual other application operations, block 506. For example, the analysis application 230 multiplies the 900 doctor office visit scheduling operations on Monday from 12:00 PM to 1:00 PM by the 10 MB of memory required for each individual doctor office visit scheduling operation to calculate a minimal memory utilization of 9,000 MB of memory required for the 900 doctor office visit scheduling operations on Monday from 12:00 PM to 1:00 PM.

A total resource utilization is optionally calculated based on the sum of a first resource utilization and a second resource utilization, block 508. For example, the analysis application 230 adds the minimal memory utilization of 18,000 MB of memory required for the 1,500 medication ordering operations on Monday from 12:00 PM to 1:00 PM to the minimal memory utilization of 9,000 MB of memory required for the 900 doctor office visit scheduling operations on Monday from 12:00 PM to 1:00 PM to calculate a total minimal memory utilization of 27,000 MB of memory required for the healthcare application on Monday from 12:00 PM to 1:00 PM.

A resource utilization ratio is optionally calculated based on a first resource utilization divided by a total resource utilization, block 510. For example, the analysis application 230 divides the minimal memory utilization of 18,000 MB of memory required for the 1,500 medication ordering operations on Monday from 12:00 PM to 1:00 PM by total minimal memory utilization of 27,000 MB of memory required for the healthcare application on Monday from 12:00 PM to 1:00 PM to calculate the memory utilization ratio of two-thirds of the memory for the 1,500 medication ordering operations on Monday from 12:00 PM to 1:00 PM.

A resource allocated to the number of application operations associated with a time period is optionally calculated based on the resource utilization ratio multiplied by a combined resource allocated to the number of application operations associated with a time period and the number of other application operations associated with the time period, block 512. For example, the analysis application 230 multiplies the memory utilization ratio of two-thirds of the memory required for the 1,500 medication ordering operations on Monday from 12:00 PM to 1:00 PM by the 36,000 MB of memory allocated to the healthcare application on Monday from 12:00 PM to 1:00 PM to calculate 24,000 MB of memory allocated to the 1,500 medication ordering operations on Monday from 12:00 PM to 1:00 PM.

A resource ratio is calculated based on a resource allocated to the number of application operations associated with a time period divided by the number of application operations associated with the time period, block 514. For example, the analysis application 230 divides the 24,000 MB of memory allocated to the medication ordering operation on Monday from 12:00 PM to 1:00 PM by the 1,500 medication ordering operations on Monday from 12:00 PM to 1:00 PM to calculate the resource ratio of 16 MB of memory for every mediation ordering application required to achieve the average execution time of 1.5 seconds for the medication ordering application.

A projected resource allocation is calculated based on the projected number of application operations multiplied by a resource ratio, block 516. For example, the analysis application 230 multiplies the current 4,000 medication ordering operations by the resource ratio of 16 MB of memory for every mediation ordering application required to achieve the average execution time of 1.5 seconds for the medication ordering operation to calculate a projected resource allocation of 64,000 MB of memory required to achieve the average execution time of 1.5 seconds for the 4,000 medication ordering operations.

A projected resource allocation is output, act 518. For example, the analysis application 230 outputs the projected resource allocation of 64,000 MB of memory required to achieve the average execution time of 1.5 seconds for the 4,000 medication ordering operations via a user interface or an application program interface.

Although FIG. 5 depicts the blocks 502-518 occurring in a specific order, the blocks 502-518 may occur in another order. Embodiments herein enable projecting resource allocations to achieve specified application operation times in a virtually provisioned environment. The analysis application 230 calculates the amount of allocated resources required for each application to achieve the requirements of their corresponding service level agreements, enabling the achievement of all service level agreement requirements without wastefully allocating too many resources for any application.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for projecting resource allocations to achieve specified application operation times in a virtually provisioned environment, the system comprising:
    one or more processors; and
    a non-transitory computer readable medium storing a plurality of instructions, which when executed, cause the one or more processors to:
        monitor a start time and a finish time for each of a plurality of executions of an application operation;
        identify a time period associated with an average execution time of the application operation based on the monitored start and finish times of the plurality of executions of the application operation;
        determine a resource ratio for the time period by:
            calculating a first resource utilization based on the number of executions of the application operation associated with the time period multiplied by a resource utilization per each individual execution of the application operation;
            calculating a second resource utilization based on a number of executions of another application operation associated with the time period multiplied by a resource utilization per each individual execution of the other application operation;
            calculating a total resource utilization based on a sum of the first resource utilization and the second resource utilization;
            calculating a resource utilization ratio based on the first resource utilization divided by the total resource utilization;
            calculating a resource allocated to the number of executions of the application operation associated with the time period based on the resource utilization ratio multiplied by a combined resource allocated to the number of executions of the application operation associated with the time period and the number of executions of the other application operation associated with the time period; and
            determining the resource ratio by dividing the resource allocated to a number of the plurality of executions of the application operation associated with the time period by the number of the plurality of executions of the application operation associated with the time period;
        determine a projected resource allocation based on a projected number of executions of the application operation and the resource ratio; and
        modify a current resource allocation by provisioning more resources or fewer resources, wherein provisioning more resources or less resources achieves the determined projected resource allocation.

2. The system of claim 1, wherein the average of execution times of the application operation is based on a service level agreement.

3. The system of claim 1, wherein the resource allocated to the number of executions of the application operation associated with the time period comprises one of a central processing unit resource, a memory resource, an input-output resource, and a network resource.

4. The system of claim 1, wherein the resource allocated to the number of executions of the application operation associated with the time period is identified based on recording utilization measurement for each resource of a plurality of resources for servers identified as involved with an application operation by an endpoints configuration.

5. The system of claim 1, wherein the projected number of executions of the application operation comprises a current number of executions of the application operation.

6. A computer-implemented method for projecting resource allocations to achieve specified application operation times in a virtually provisioned environment, the method comprising:
    monitoring at least a start time and a finish time for a plurality of executions of an application operation;
    identifying a time period associated with an average execution time of the application operation based on the monitored start and finish times of the plurality of executions of the application operation;
    determining a resource ratio for the time period by:
        calculating a first resource utilization based on the number of executions of the application operation associated with the time period multiplied by a resource utilization per each individual execution of the application operation;

calculating a second resource utilization based on a number of executions of another application operation associated with the time period multiplied by a resource utilization per each individual execution of the other application operation;

calculating a total resource utilization based on a sum of the first resource utilization and the second resource utilization;

calculating a resource utilization ratio based on the first resource utilization divided by the total resource utilization;

calculating a resource allocated to the number of executions of the application operation associated with the time period based on the resource utilization ratio multiplied by a combined resource allocated to the number of executions of the application operation associated with the time period and the number of executions of the other application operation associated with the time period; and determining the resource ratio by dividing the resource allocated to a number of the plurality of executions of the application operation associated with the time period by the number of the plurality of executions of the application operation associated with the time period;

determining a projected resource allocation based on a projected number of executions of the application operation and the resource ratio; and modifying a current resource allocation by provisioning more resources or fewer resources, wherein provisioning more resources or less resources achieves the determined projected resource allocation.

7. The computer-implemented method of claim 6, wherein the average of execution times of the application operation is based on a service level agreement.

8. The computer-implemented method of claim 6, wherein the resource allocated to the number of executions of the application operation associated with the time period comprises one of a central processing unit resource, a memory resource, an input-output resource, and a network resource.

9. The computer-implemented method of claim 6, wherein the resource allocated to the number of executions of the application operation associated with the time period is identified based on recording utilization measurement for each resource of a plurality of resources for servers identified as involved with an execution of the application operation by an endpoints configuration.

10. The computer-implemented method of claim 6, wherein the projected number of executions of the application operation comprises a current number of executions of the application operation.

11. A computer program product, comprising a non-transitory computer-readable medium having a computer-readable program code embodied therein to be executed by one or more processors, the program code including instructions to:

monitor at least a start time and a finish time for a plurality of executions of an application operation;

identify a time period associated with an average execution time of the application operation based on the monitored start and finish times of the plurality of executions of the application operation;

determine a resource ratio for the time period by:

calculating a first resource utilization based on the number of executions of the application operation associated with the time period multiplied by a resource utilization per each individual execution of the application operation;

calculating a second resource utilization based on a number of executions of another application operation associated with the time period multiplied by a resource utilization per each individual execution of the other application operation;

calculating a total resource utilization based on a sum of the first resource utilization and the second resource utilization;

calculating a resource utilization ratio based on the first resource utilization divided by the total resource utilization;

calculating a resource allocated to the number of executions of the application operation associated with the time period based on the resource utilization ratio multiplied by a combined resource allocated to the number of executions of the application operation associated with the time period and the number of executions of the other application operation associated with the time period; and determining the resource ratio by dividing the resource allocated to a number of the plurality of executions of the application operation associated with the time period by the number of the plurality of executions of the application operation associated with the time period;

determine a projected resource allocation based on a projected number of executions of the application operation and the resource ratio; and modify a current resource allocation by provisioning more resources or fewer resources, wherein provisioning more resources or less resources achieves the determined projected resource allocation.

12. The computer program product of claim 11, wherein the average of execution times of the application operation is based on a service level agreement.

13. The computer program product of claim 11, wherein the resource allocated to the number of executions of the application operation associated with the time period comprises one of a central processing unit resource, a memory resource, an input-output resource, and a network resource.

14. The computer program product of claim 11, wherein the resource allocated to the number of executions of the application operation associated with the time period is identified based on recording utilization measurement for each resource of a plurality of resources for servers identified as involved with execution of the application operation by an endpoints configuration.

15. The computer program product of claim 11, wherein the projected number of executions of the application operation comprises a current number of executions of the application operation.

* * * * *